US008313823B2

(12) United States Patent
Spangler et al.

(10) Patent No.: US 8,313,823 B2
(45) Date of Patent: Nov. 20, 2012

(54) METHOD FOR COATING A METALLIC SUBSTRATE WITH A POWDER COATING COMPOSITION AND AN AUTODEPOSITABLE COATING COMPOSITION

(75) Inventors: John M. Spangler, Peoria, IL (US); Jonathan Savage, Metamora, IL (US); Gregory Osborn, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 1124 days.

(21) Appl. No.: 12/217,640

(22) Filed: Jul. 8, 2008

(65) Prior Publication Data

US 2010/0009141 A1 Jan. 14, 2010

(51) Int. Cl.
*B32B 3/00* (2006.01)

(52) U.S. Cl. ..................... 428/192; 428/195.1; 428/206; 428/209; 428/418; 428/458; 428/463; 428/480; 296/187.01

(58) Field of Classification Search ............... 428/195.1, 428/206–209, 413, 418, 458, 461, 463, 480, 428/482, 522; 524/904

See application file for complete search history.

(56) References Cited

U.S. PATENT DOCUMENTS

| | | | | |
|---|---|---|---|---|
| 3,850,664 | A | 11/1974 | Siegmund, Jr. | |
| 3,953,644 | A | 4/1976 | Camelon et al. | |
| 4,142,018 | A | 2/1979 | Ozawa et al. | |
| 4,220,675 | A | 9/1980 | Imazaki | |
| 4,457,956 | A | 7/1984 | Park | |
| 4,601,916 | A * | 7/1986 | Arachtingi | 204/479 |
| 5,503,939 | A | 4/1996 | Rink et al. | |
| 5,747,106 | A | 5/1998 | Matsunaga | |
| 5,786,037 | A | 7/1998 | Vergani | |
| 5,922,413 | A | 7/1999 | Takeda | |
| 5,939,195 | A | 8/1999 | Allen et al. | |
| 6,146,709 | A | 11/2000 | Katz et al. | |
| 6,211,283 | B1 * | 4/2001 | Honda et al. | 524/501 |
| 6,221,441 | B1 | 4/2001 | Emch | |
| 6,337,139 | B1 | 1/2002 | Sapper | |
| 6,596,347 | B2 | 7/2003 | Emch | |
| 6,746,719 | B2 | 6/2004 | McAndrew | |
| 2004/0191555 | A1 * | 9/2004 | Germano | 428/553 |
| 2006/0193989 | A1 | 8/2006 | Wegner | |
| 2007/0075087 | A1 | 4/2007 | Knight | |
| 2007/0190244 | A1 | 8/2007 | Corbett, Sr. et al. | |
| 2007/0196585 | A1 | 8/2007 | Corbett, Sr. et al. | |

* cited by examiner

*Primary Examiner* — Gerard Higgins
*Assistant Examiner* — Christopher Polley
(74) *Attorney, Agent, or Firm* — Liell & McNeil

(57) ABSTRACT

A method for coating a metallic substrate includes applying a powder coating composition to a majority of a surface of the metallic substrate, and applying an autodepositable coating composition to less than the majority of the surface of the metallic substrate. According to a preferred embodiment, the powder coating composition is applied to at least one continuous surface of the metallic substrate, while the autodepositable coating composition is applied to at least one discontinuous surface, such as an edge, of the metallic substrate.

6 Claims, 2 Drawing Sheets

METHOD FOR COATING A METALLIC SUBSTRATE WITH A POWDER COATING COMPOSITION AND AN AUTODEPOSITABLE COATING COMPOSITION

TECHNICAL FIELD

The present disclosure relates generally to a method for coating a metallic substrate, and more particularly to a method for coating a majority of a surface of the metallic substrate with a powder coating composition and less than the majority of the surface with an autodepositable coating composition.

BACKGROUND

Metallic components typically undergo one or more processes that provide surfaces of the metallic components with a number of desirable physical, chemical, and aesthetic qualities. Metallic components manufactured for use with on-highway or off-highway machines, for example, may undergo a series of processes that enhance the strength and/or durability of the components, such as to withstand harsh operating conditions of the machine. Specifically, finishing processes for some metallic machine components may include coating the components with one or more coating compositions that provide protection from corrosion, weathering, ultraviolet degradation, and other environmental factors that may damage the coating composition and the underlying component.

A variety of coating methods and compositions are known for coating metallic surfaces, each offering its own unique advantages and, oftentimes, disadvantages. For example, a powder coating composition may provide improved corrosion and weathering protection on most metallic surfaces. However, it is known that powder coating compositions, typically applied using an electrostatic spraying method, may be susceptible to less than adequate coverage on edges and recessed areas. An emulsified liquid coating composition, which may be applied using a known dip coating process, may provide improved edge coverage, when compared to powder coating, but may be susceptible to weathering issues and ultraviolet degradation. Therefore, it may be desirable to combine one or more coating compositions and/or coating methods to provide an improved coating for metallic machine components.

U.S. Pat. No. 6,221,441 teaches a process for coating a substrate with a liquid basecoat and a powder topcoat. Specifically, a liquid basecoat is applied to a surface of a metallic substrate and then partially cured to provide a dried basecoat. A powder topcoat is then applied directly to the dried basecoat. Thereafter, both the powder topcoat and the dried basecoat may be simultaneously cured using hot air convection and/or infrared heating. By only partially curing the liquid basecoat, prior to application of the powder topcoat, the cited reference may provide a multiple layer coating process having a decreased process time. However, large cost implications of applying such a multiple layer coating process should be readily appreciated. In addition, there remains a continuing need for coating compositions and/or coating methods for metallic components, such as metallic machine components, that exhibit desirable performance characteristics without greatly increasing costs.

The present disclosure is directed to one or more of the problems set forth above.

SUMMARY OF THE DISCLOSURE

In one aspect, a method for coating a metallic substrate includes steps of applying a powder coating composition to a majority of a surface of the metallic substrate, and applying an autodepositable coating composition to less than the majority of the surface of the metallic substrate.

In another aspect, a coated metallic substrate includes a powder coating composition applied to a majority of a surface of a metallic substrate, and an autodepositable coating composition applied to less than the majority of the surface of the metallic substrate.

In yet another aspect, a machine includes a chassis supporting at least one coated metallic substrate. The coated metallic substrate includes a powder coating composition applied to a majority of a surface of a metallic substrate, and an autodepositable coating composition applied to less than the majority of the surface of the metallic substrate.

DETAILED DESCRIPTION

Figure 1:
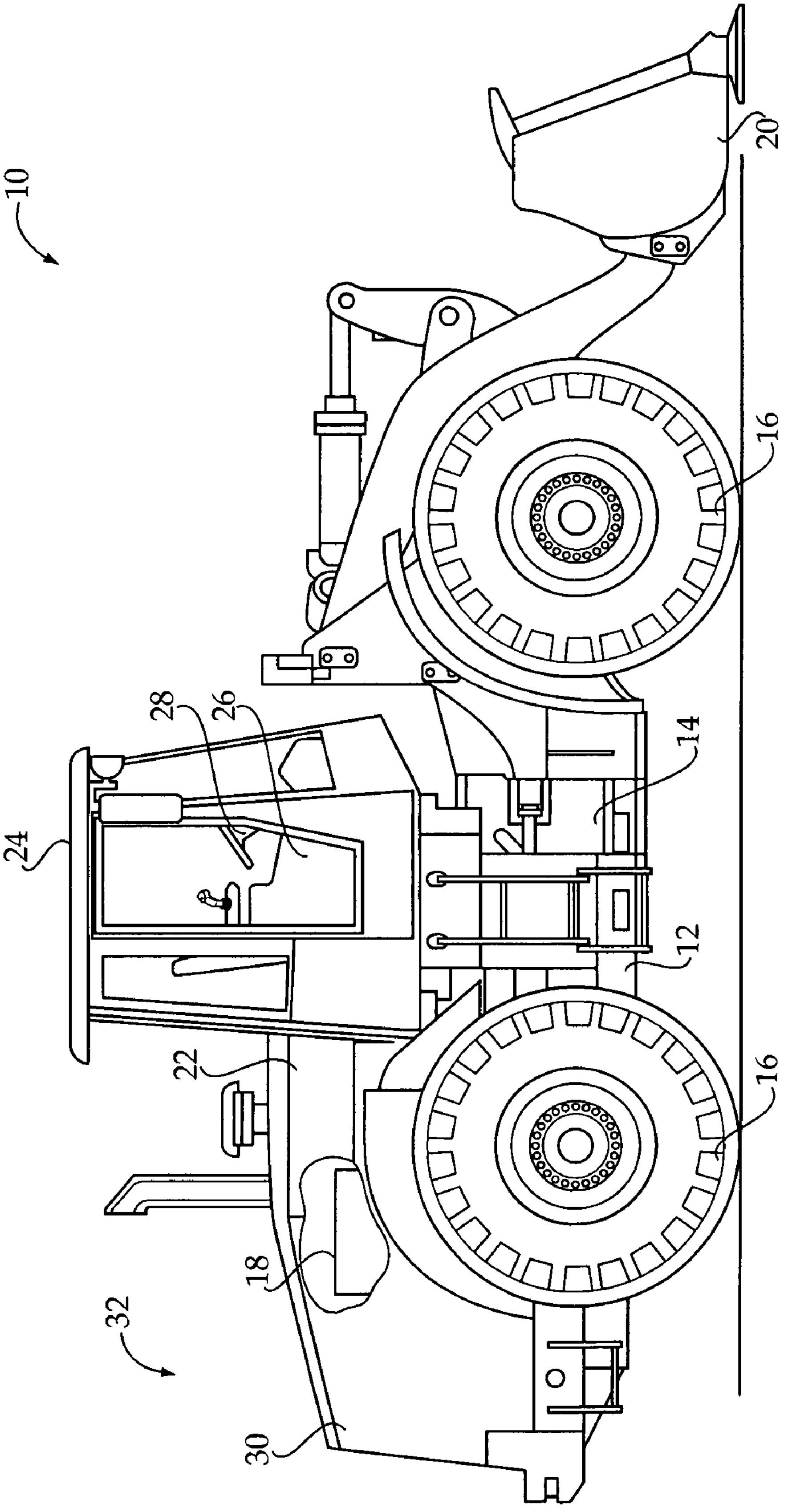
FIG. 1 is a side diagrammatic view of a machine, according to the present disclosure.

An exemplary embodiment of a machine 10 is shown generally in FIG. 1. The machine 10 may be a wheel loader, as shown, or any other on-highway or off-highway vehicle used to perform work operations. As shown in the illustrated embodiment, the machine 10 may generally include a chassis 12 having a drive system 14 supported thereon for driving wheels 16 of the machine 10. An internal combustion engine 18, also supported on the chassis 12, may provide power to the drive system 14 and additional systems requiring power, such as, for example, a hydraulic system (not shown) used for controlling an implement 20 of the machine 10.

A machine body, shown generally at 22, may also be mounted on the chassis 12 for housing and/or supporting one or more components of the machine 10, such as, for example, the drive system 14, internal combustion engine 18, and hydraulic system, described above. Similarly, an operator control station 24 may be mounted on the chassis 12, or machine body 22, for housing and/or supporting devices that facilitate operator control, such as, for example, a seat assembly 26 and a steering device 28. It should be appreciated, however, that the machine 10, as described herein, has been simplified for exemplary purposes, and is in no way meant to be limited to the specific systems or structures described.

The chassis 12, machine body 22, operator control station 24, and/or other components of the machine 10 may include one or more coated metallic substrates. According to one embodiment, the machine body 22 may include a coated metallic substrate 30, positioned at a back end 32 of the machine 10 and housing the internal combustion engine 18. The coated metallic substrate 30, simplified and shown in FIG. 2, may be rectangular shaped and may generally include a top panel 40 extending between two spaced apart side panels 42 and 44, and a rear panel 46. It should be appreciated that the coated metallic substrate 30 may include one integral structure or may include a multi-paneled enclosure for enclosing the internal combustion engine 18 and other components of the machine 10.

The coated metallic substrate 30 is preferably a ferrous metallic substrate including metals such as, for example, iron, steel, and alloys thereof. Although a specific embodiment is described, it should be appreciated that the coated metallic substrate 30 may be used as a component to fabricate any part of the machine 10, such as, for example, other parts of the machine body 22. As such, the coated metallic substrate 30 may include any shape, size, or composition. Further, although an exemplary context is provided, the coated metallic substrate 30 should not be limited to on-highway or off-highway machines, but may be applicable for use with various other products requiring similar performance characteristics to those described herein.

Figure 3:
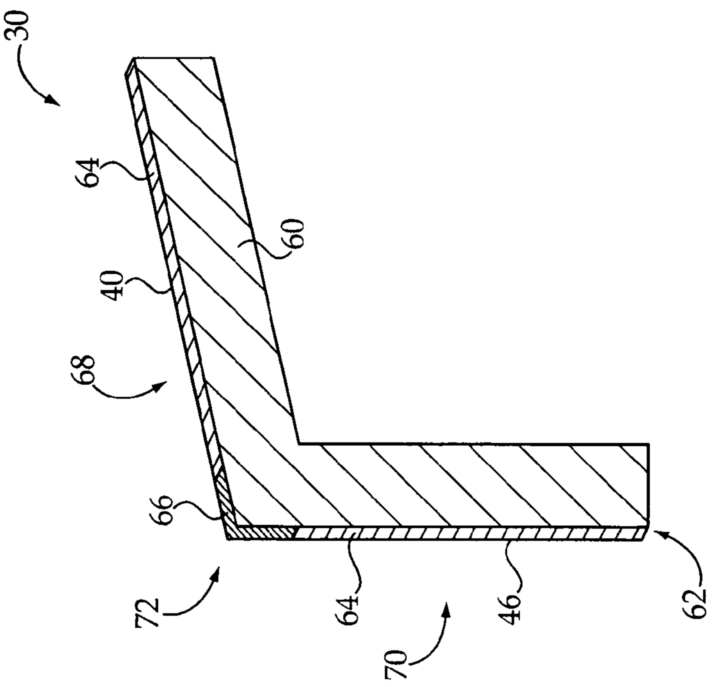
FIG. 3 is a cross sectional view taken along lines 3-3 of FIG. 2.
Figure 2:
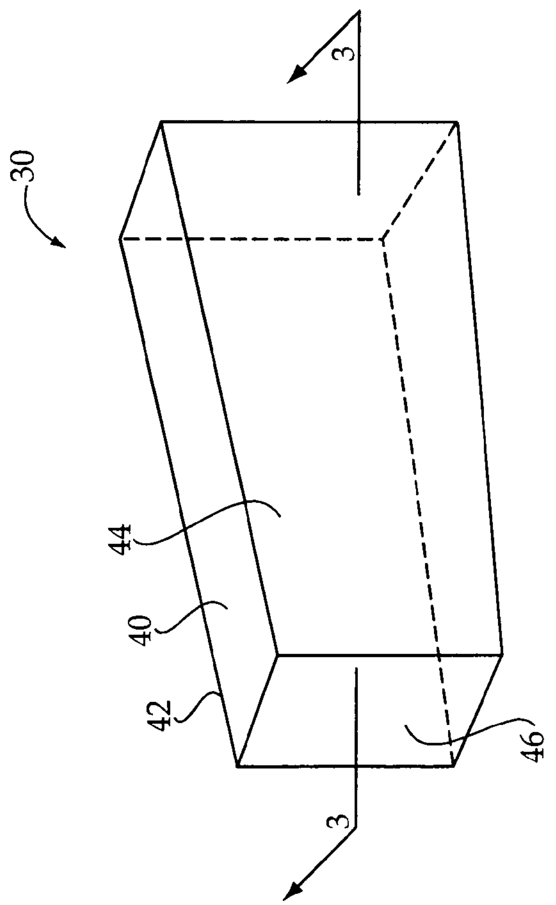
FIG. 2 is a perspective view of a coated metallic substrate that may be supported on the machine of FIG. 1.

Turning now to FIG. 3, a cross sectional view of the coated metallic substrate 30 is shown, taken along lines 3-3 of FIG. 2. The coated metallic substrate 30 may generally include a metallic substrate 60, as described above, and at least one coating composition applied to a surface 62 of the metallic substrate 60. Preferably, the metallic substrate 60 includes a powder coating composition 64 applied to a majority of the surface 62 of the metallic substrate 60, and an autodepositable coating composition 66 applied to less than the majority of the surface 62 of the metallic substrate 60. It should be appreciated that a "majority" as used herein, may generally refer to greater than fifty percent of a surface area being coated. It should also be appreciated that surface 62 is an exemplary surface, and additional surface areas of the metallic substrate 60 may similarly be coated.

According to a specific embodiment, the powder coating composition 64 may be applied to at least one continuous surface of the metallic substrate 60, such as continuous surfaces 68 and 70, and the autodepositable coating composition 66 may be applied to at least one discontinuous surface 72. As used herein, a "continuous" surface may include a substantially planar or smooth contour surface, while a "discontinuous" surface may include, for example, an edge, corner, recess, channel, or other area that does not represent a continuous plane or smoothly curved surface. It should be appreciated that the continuous surfaces 68 and 70, or the discontinuous surface 72, may include minor surface discontinuities, such as, for example, threaded bores positioned therethrough for receiving screws, bolts, nuts, fasteners, and the like.

Before applying either of the powder coating composition 64 and the autodepositable coating composition 66, it may be preferable to remove any foreign substances deposited on the surface 62 of the metallic substrate 60. Such foreign substances, may include, for example, grease, dirt, dust, oils, or any other substances that may interfere with a coating process. The surface 62 of the metallic substrate 60 may be cleaned, and/or degreased, using any known physical or chemical means. For example, a cleaning agent, such as any commercially available alkaline or acidic cleaning agents, may be used. Alternatively, or additionally, a tap water, or city water, may be used to wash the surface 62 of the metallic substrate 60.

Following cleaning, the metallic substrate 60 may be rinsed with water, such as tap water or de-ionized water, in order to remove any residue. The metallic substrate 60 may also be treated with a layer of pretreatment, as should be appreciated by those skilled in the art. Pretreatments are known and may be selected, based on the composition of the metallic substrate 60 or certain environmental considerations, to improve adhesion of subsequent coating layers and/or to improve performance characteristics of the metallic substrate 60, such as, for example, corrosion resistance. It should be appreciated that alternative means for cleaning and/or pretreatment are contemplated for use with the present disclosure.

The powder coating composition 64 may include any known powder coating composition, and may be applied to the surface 62 of the metallic substrate 60 using conventional means, such as, for example, electrostatic spraying. According to one embodiment, the powder coating composition 64 may include a thermosettable polyester; however, other powder coating compositions may alternatively be selected. The powder coating composition 64 may be applied to a majority of the surface 62 in one or more passes to provide a coating layer having a desired thickness. It should be appreciated that the powder coating composition 64 may be applied directly to the surface 62 of the metallic substrate 60 or, alternatively, may be applied to a primer coating layer, having a composition well known to those skilled in the art.

Although the powder coating composition 64 may be directed to the entire surface 62 of the metallic substrate 60, including both the continuous surfaces 68 and 70 and the discontinuous surface 72, it should be appreciated that certain areas may inhibit the electrostatic application of the powder coating composition 64. This condition, known as the Faraday cage effect, may prevent proper application of the powder coating composition 64 along edges, corners, recesses, channels, or other areas that do not represent continuous surfaces. Therefore, it should be appreciated that the powder coating composition 64 may be applied to the continuous surfaces 68 and 70 of the metallic substrate 60, leaving the discontinuous surface 72 free of the powder coating composition 64.

After application of the powder coating composition 64, the metallic substrate 60 may be heated to a temperature sufficient to cure, at least partially, the powder coating composition 64. According to one embodiment, it may only be desirable to melt, and coalesce, the powder coating composition prior to application of the autodepositable coating composition 66. Alternatively, however, it may be desirable to completely cure the powder coating composition 64. It should be appreciated that a typical curing process for the powder coating composition 64 may include heating the metallic substrate to a target temperature for a predetermined period of time, using any of the conventional heating means.

The autodepositable coating composition 66 may be applied to portions of the surface 62 of the metallic substrate 60 that are free of the powder coating composition 64 using an autodeposition process. The autodepositable coating composition 66 may include any known autodepositable coating compositions, including, for example, Autophoretic® or Autophoretic Coating Chemicals (ACC®) provided by Henkel Surface Technologies. According to one embodiment, the autodepositable coating composition may include an Autophoretic® coating including an epoxy-acrylic based resin; however, other autodepositable coating compositions may alternatively be selected.

Autodeposition is known and generally includes the application of a waterborne coating layer on a metallic surface (usually ferrous, but may be aluminum, titanium, etc.) by means of a chemical reaction. Specifically, the metallic substrate 60 may be dipped, or immersed, into a chemical bath, where pigment and resin particles may be deposited onto the surface 62 of the metallic substrate 60. It should be appreciated, therefore, that the autodepositable coating composition 66 will be applied only to the bare surfaces of the metallic substrate 60, such as the discontinuous surface 72, that are free of the powder coating composition 64. It should also be appreciated that the autodepositable coating composition 66 may be applied to less than a majority, and maybe only a small fraction, of the total coated surface 62 of the metallic substrate 60, as shown in FIG. 3.

As is known in the art, the metallic substrate 60 may undergo one or more rinse stages, after application of the autodepositable coating composition 66. For example, the metallic substrate 60 may undergo a first rinse to remove any coating material that has not deposited on the surface 62 of the metallic substrate. In addition, a reaction rinse may be provided to allow new properties, such as, for example, increased corrosion resistance, to be introduced to the autodepositable coating composition 66 before curing. After the rinse stages, the metallic substrate 60 may be heated, using any known means, to a temperature sufficient to cure the autodepositable coating composition 66. Specifically, the metallic substrate 60 may be heated to a target temperature for a predetermined time to sufficiently cure the autodepositable coating composition 66. In addition, if the powder coating composition 64 was not fully cured, both the autodepositable coating composition 66 and the powder coating composition 64 may be simultaneously cured.

It should be appreciated that additional processes may be incorporated into the disclosed method of coating a metallic substrate 60, without deviating from the scope of the present disclosure. Specifically, additional finishing methods or techniques may be used to further enhance physical, chemical, and aesthetic qualities of the coated metallic substrate 30.

Industrial Applicability

The present disclosure finds potential application in any metallic substrate having a coated surface for enhancing physical, chemical, or aesthetic qualities of the metallic substrate. Further, the disclosure may be specifically applicable to ferrous metallic substrates that may require protection from corrosion, weathering, ultraviolet degradation, and/or other environmental factors. Yet further, the present disclosure may be applicable to such ferrous metallic substrates, or other metallic substrates, that are manufactured for use with on-highway or off-highway machines.

Referring generally to FIGS. 1-3, a machine 10, as described above, may include one or more coated metallic substrates, such as coated metallic substrate 30. The coated metallic substrate 30 may generally include a metallic substrate 60, such as a ferrous metallic substrate, and at least one coating composition applied to a surface 62 of the metallic substrate 60. Preferably, the metallic substrate 60 includes a powder coating composition 64 applied to a majority of the surface 62 of the metallic substrate 60, and an autodepositable coating composition 66 applied to less than the majority of the surface 62 of the metallic substrate 60.

Specifically, the powder coating composition 64 may first be applied, such as by using an electrostatic spraying process, to the surface 62 of the metallic substrate 60. It should be appreciated that certain areas, such as a discontinuous surface 72, may inhibit the electrostatic application of the powder coating composition 64 due to a condition known as the Faraday cage effect. Thus, the powder coating composition 64 may be applied only to continuous surfaces 68 and 70 of the metallic substrate 60, leaving the discontinuous surface 72 free of the powder coating composition 64.

Next, the autodepositable coating composition 66 may be applied only to surfaces of the metallic substrate 60 that are free of the powder coating composition 64, such as the discontinuous surface 72. Specifically, since the autodeposition process involves a chemical reaction with a ferrous metallic surface, the autodepositable coating composition 66 may be applied only to bare surfaces of the metallic substrate 60. As described above, these bare surfaces may include edges, corners, recesses, channels, or other areas that do not represent a continuous plane or curved surface. It should be appreciated that these areas may typically represent less than a majority, and likely only a small fraction, of the surface 62 of the metallic substrate. As a result, application of the relatively costly autodepositable coating composition 66 may be limited to only those areas not covered with the powder coating composition 64, such as the discontinuous surface 72.

It should be appreciated that the coated metallic substrate 30, and coating method therefor, described herein, provides a robust, corrosion and weathering resistant coating that may be applied to the surface 62 of a metallic substrate 60, including continuous surfaces 68 and 70 and discontinuous surface 72. The cost savings resulting from the application of an autodepositable coating composition 66 only to the bare surfaces of the metallic substrate 60, which are free of the powder coating composition 64, should be readily appreciated. Specifically, less autodepositable coating composition 66 is applied to the metallic substrate 60 and, as a result, changes within the autodepositable coating composition bath parameters may be reduced, leading to lower maintenance costs, higher bath stability, and process robustness.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A coated metallic substrate, comprising:
a metallic substrate;
a powder coating composition covering a majority of the metallic substrate; and
an autodepositable coating composition covering less than the majority of the metallic substrate, wherein the autodepositable coating composition covers at least one discontinuous surface of the metallic substrate, wherein the autodepositable coating, composition and the powder coating composition together define a single coating layer of the metallic substrate.

2. The coated metallic substrate of claim 1, wherein the powder coating composition covers at least one continuous surface of the metallic substrate.

3. The coated metallic substrate of claim 2, wherein the metallic substrate is a ferrous metallic substrate.

4. The coated metallic substrate of claim 2, wherein the powder coating composition includes a thermosettable polyester.

5. The coated metallic substrate of claim 2, wherein the autodepositable coating composition includes an epoxy-acrylic based resin.

6. The coated metallic substrate of claim 1, wherein the autodepositable coating composition covers an edge of the metallic substrate.

* * * * *

UNITED STATES PATENT AND TRADEMARK OFFICE

CERTIFICATE OF CORRECTION

PATENT NO. : 8,313,823 B2
APPLICATION NO. : 12/217640
DATED : November 20, 2012
INVENTOR(S) : Spangler et al.

It is certified that error appears in the above-identified patent and that said Letters Patent is hereby corrected as shown below:

In the Specification

Column 5, line 29, delete "Industrial Applicability" and insert -- INDUSTRIAL APPLICABILITY --.

In the Claims

Column 6, line 44, in Claim 1, delete "coating, composition" and insert -- coating composition --.

Signed and Sealed this
Eighteenth Day of August, 2015

Michelle K. Lee
*Director of the United States Patent and Trademark Office*